United States Patent
Wu

(10) Patent No.: US 7,040,537 B2
(45) Date of Patent: May 9, 2006

(54) FLAT CABLE ARRANGEMENT FOR A SCANNER

(75) Inventor: Jones Wu, Taipei (TW)

(73) Assignee: BENQ Corporation, Taoyuan (TW)

( * ) Notice: Subject to any disclaimer, the term of this patent is extended or adjusted under 35 U.S.C. 154(b) by 0 days.

(21) Appl. No.: 11/043,498

(22) Filed: Jan. 26, 2005

(65) Prior Publication Data

US 2005/0173535 A1    Aug. 11, 2005

(30) Foreign Application Priority Data

Feb. 10, 2004   (TW) ............................... 93201844 U

(51) Int. Cl.
*G06K 7/00* (2006.01)

(52) U.S. Cl. .................................. 235/453; 235/462.43

(58) Field of Classification Search ................ 235/453, 235/454, 462.43; 439/162, 394, 453

See application file for complete search history.

(56) References Cited

U.S. PATENT DOCUMENTS

| 4,545,636 | A | * | 10/1985 | Beatenbough et al. | ...... 439/453 |
| 4,645,364 | A | * | 2/1987 | Ohsaki | ...... 400/248 |
| 5,076,800 | A | * | 12/1991 | Milnes et al. | ...... 439/394 |
| 6,049,973 | A | * | 4/2000 | Frank et al. | ...... 29/830 |
| 6,196,855 | B1 | * | 3/2001 | Huang | ...... 439/162 |
| 6,717,702 | B1 | * | 4/2004 | Yamauchi et al. | ...... 358/497 |
| 6,903,849 | B1 | * | 6/2005 | Yokota | ...... 358/497 |

FOREIGN PATENT DOCUMENTS

| JP | 2001076547 A | * | 3/2001 |
| JP | 2001077983 A | * | 3/2001 |
| JP | 2005115031 A | * | 4/2005 |

* cited by examiner

*Primary Examiner*—Uyen-Chau N. Le
(74) *Attorney, Agent, or Firm*—Quintero Law Office

(57) ABSTRACT

A scanner. The scanner comprises a flat cable and a cable holder. The flat cable comprises a first end and a second end. The second end moves to or away from the first end along a first path. The cable holder is disposed at a restricting point between the first end and the second end, whereby, when the second end moves to the first end, the cable holder contains and folds the flat cable.

7 Claims, 7 Drawing Sheets

FLAT CABLE ARRANGEMENT FOR A SCANNER

BACKGROUND OF THE PRESENT INVENTION

1. Field of the Present Invention

The present invention relates to a scanner and in particular to a scanner with increased element clearance.

2. Description of the Related Art

FIG. 1a shows a conventional scanner 10, in which a flat cable 12 is disposed in the center of a housing 13. When scanner module 11 moves, flat cable 12 is stretched or bent with movement thereof. When flat cable 12 is bent, it can contact and possibly damage a transparent plate (not shown) above scanner module 11.

FIG. 1b shows another conventional scanner 20, in which a flat cable 22 is disposed on a structure 24 of the housing 23. When scanner module 21 moves, flat cable 22 is stretched or bent, and, when bent, may lodge between scanner module 21 and housing 23, restricting motion of scanner module 21.

SUMMARY OF THE PRESENT INVENTION

The scanner of the present invention comprises a flat cable, a shaft, a scan module and a cable holder. The shaft is disposed in the scanner. The scan module is movably disposed on the shaft. The flat cable has a first end, and a second end connected to the scan module. The cable holder is disposed at a restricting point between the first end and the second end. The cable holder has an opening, moving on the shaft with the opening.

The present invention prevents the flat cable from contacting the transparent plate or restricting movement of the scan module, thereby reducing scan errors and increasing lifetime of the scanner.

BRIEF DESCRIPTION OF THE DRAWINGS

The present invention can be more fully understood by reading the subsequent detailed description and examples with references made to the accompanying drawings, wherein.

DETAILED DESCRIPTION OF THE PRESENT INVENTION

Figure 1A:
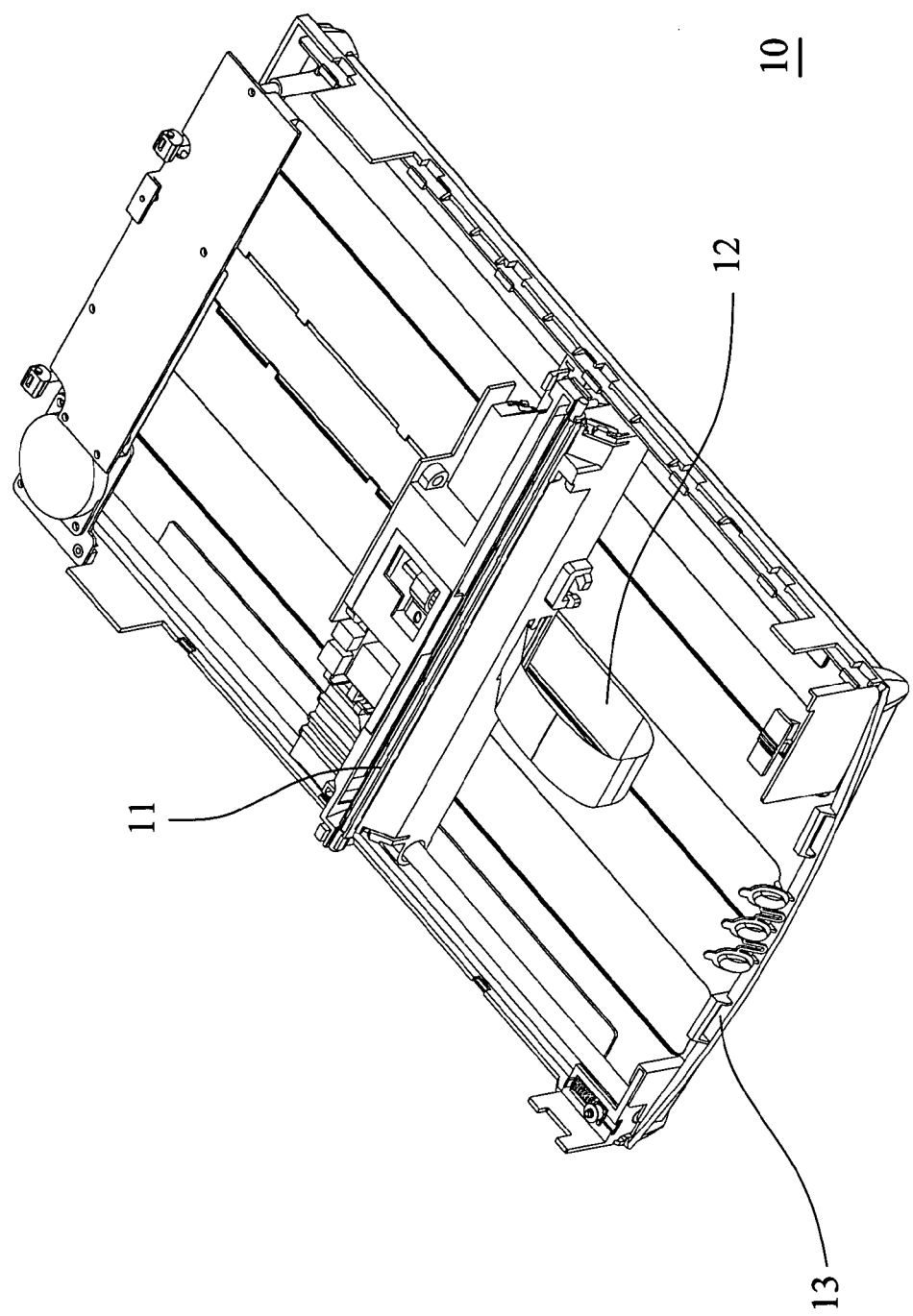
FIG. 1a shows a conventional scanner.
Figure 1B:
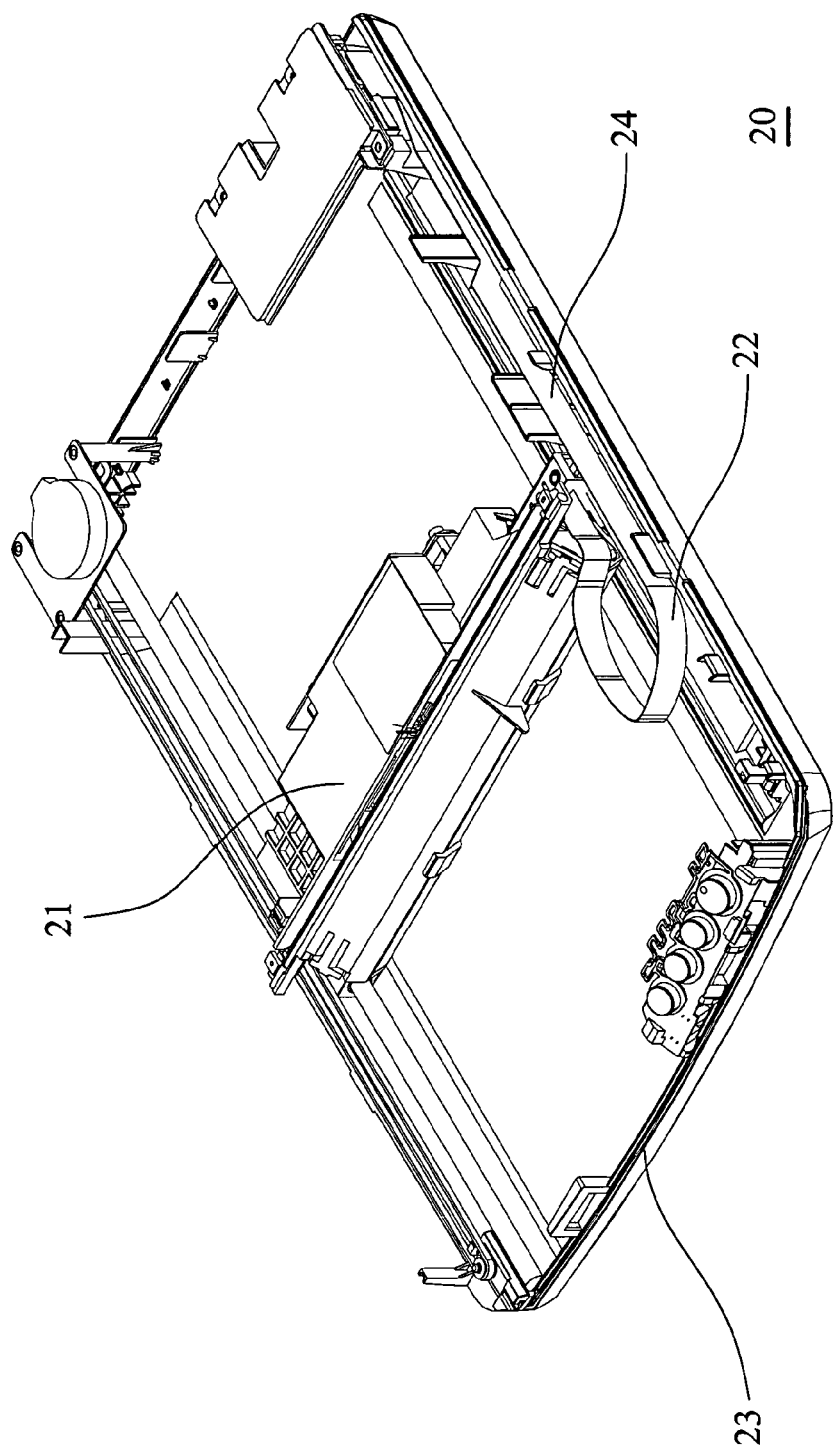
FIG. 1b shows another conventional scanner.
Figure 2A:
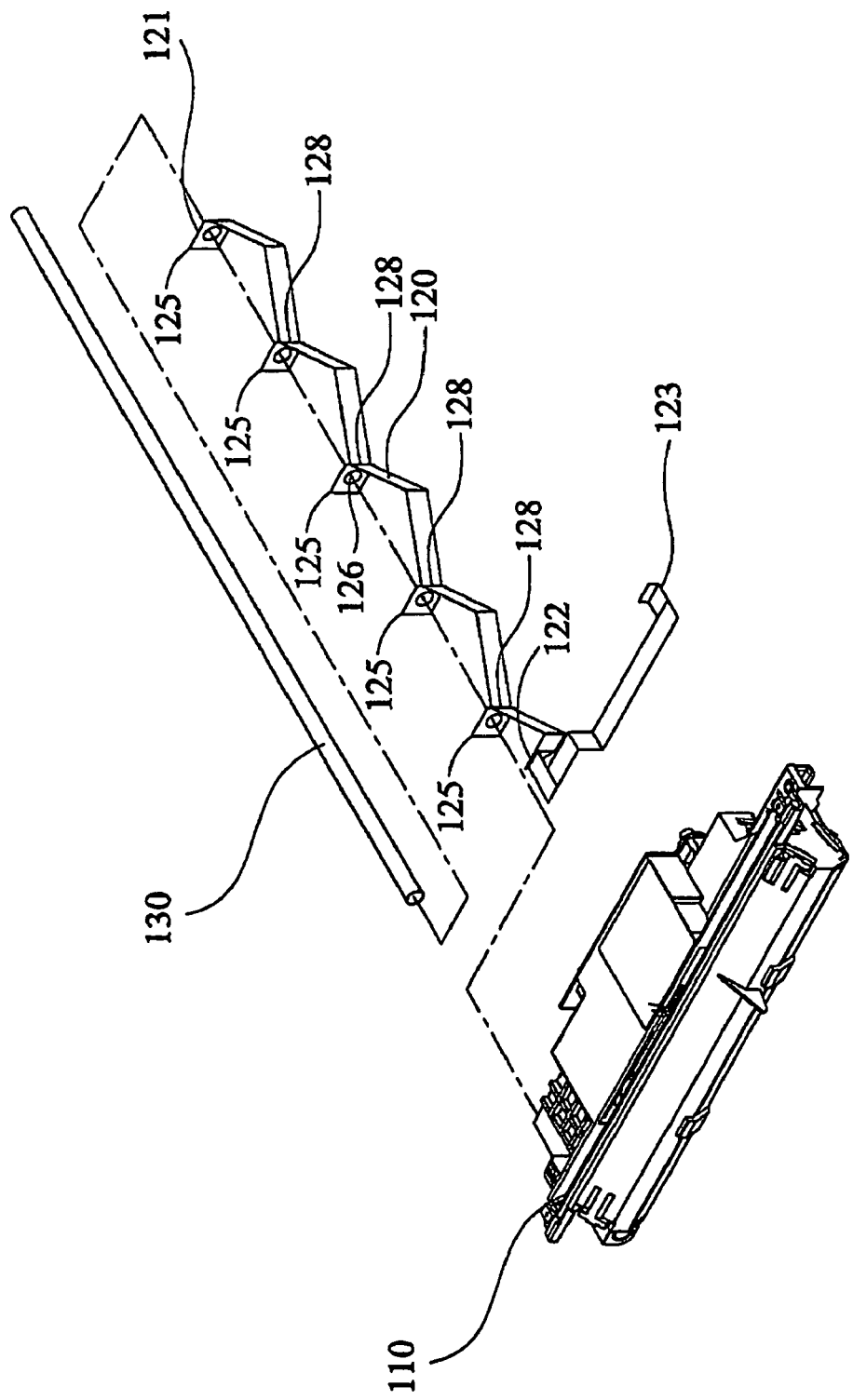
FIG. 2a is an exploded view of the main elements of the present invention.

As shown in FIG. 2a, the scanner of the present invention comprises a flat cable 120, a shaft 130, a scan module 110 and cable holders 125. The shaft 130 is disposed in the scanner. The scan module 110 is movably disposed on the shaft 130. The flat cable 120 has a first end 121 and a second end 122. The second end 122 is connected to the scan module 110 by a connector 123. The cable holders 125 are disposed on restricting points (angle portions 128) between the first end 121 and the second end 122. Each cable holder 125 has an opening 126, moving on the shaft 130 with the opening 126. FIG. 2a is a combined figure of the flat cable 120, the shaft 130, the scan module 110 and the cable holders 125.

Figure 3:
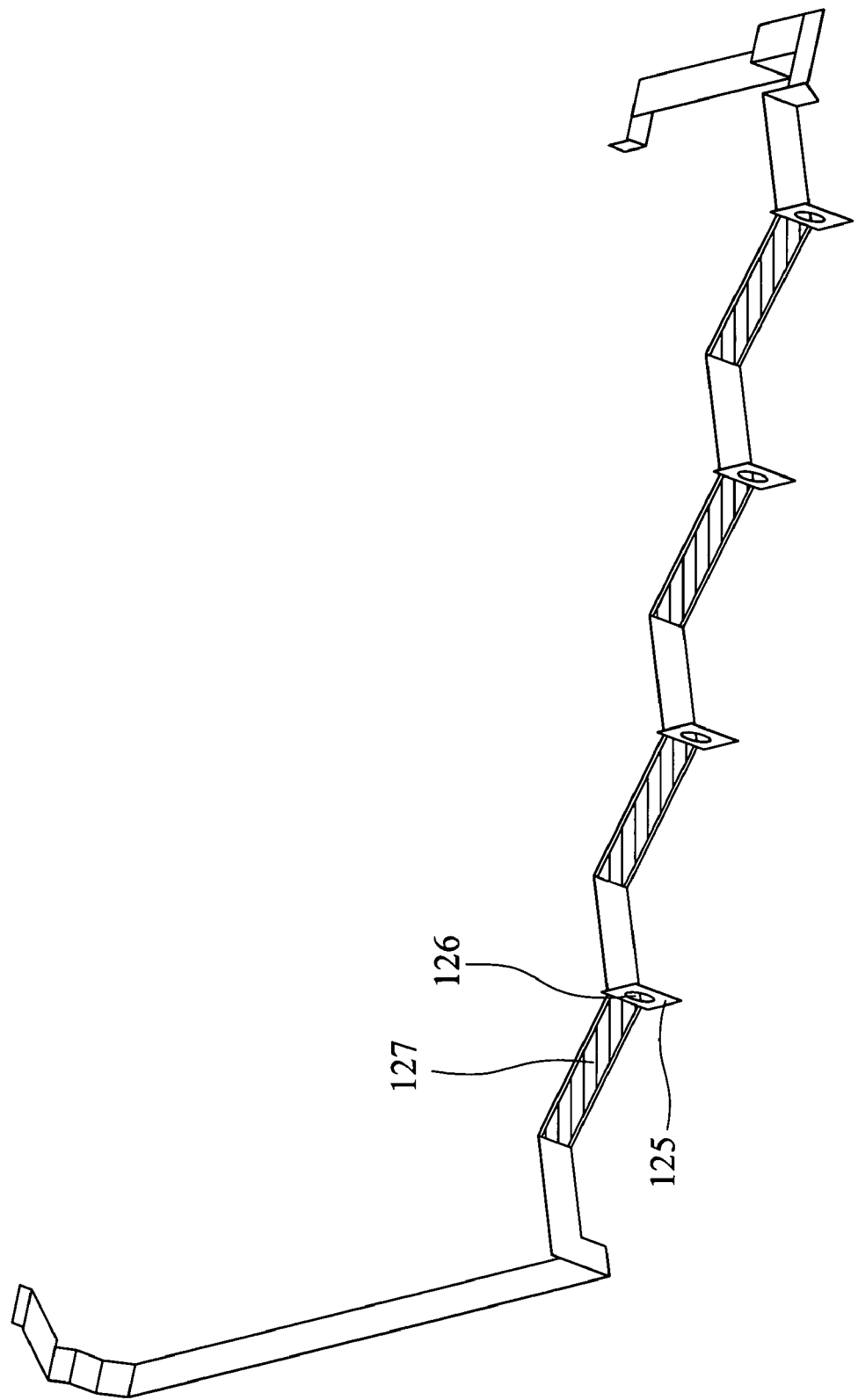
FIG. 3 shows a detailed structure of the flat cable.

The flat cable 120 is pleated in, for example, a triangular or sine wave profile, and comprises extendable and compressible metal lines, collapsing into pleats by folding. As shown in FIG. 3, cable holders 125 are attached on the flat cable 120 by attachment portions 127. Cable holders 125 can also be directly formed on the flat cable 120, of non-abrasive plastic material which is light and highly flexible.

Figure 2B:
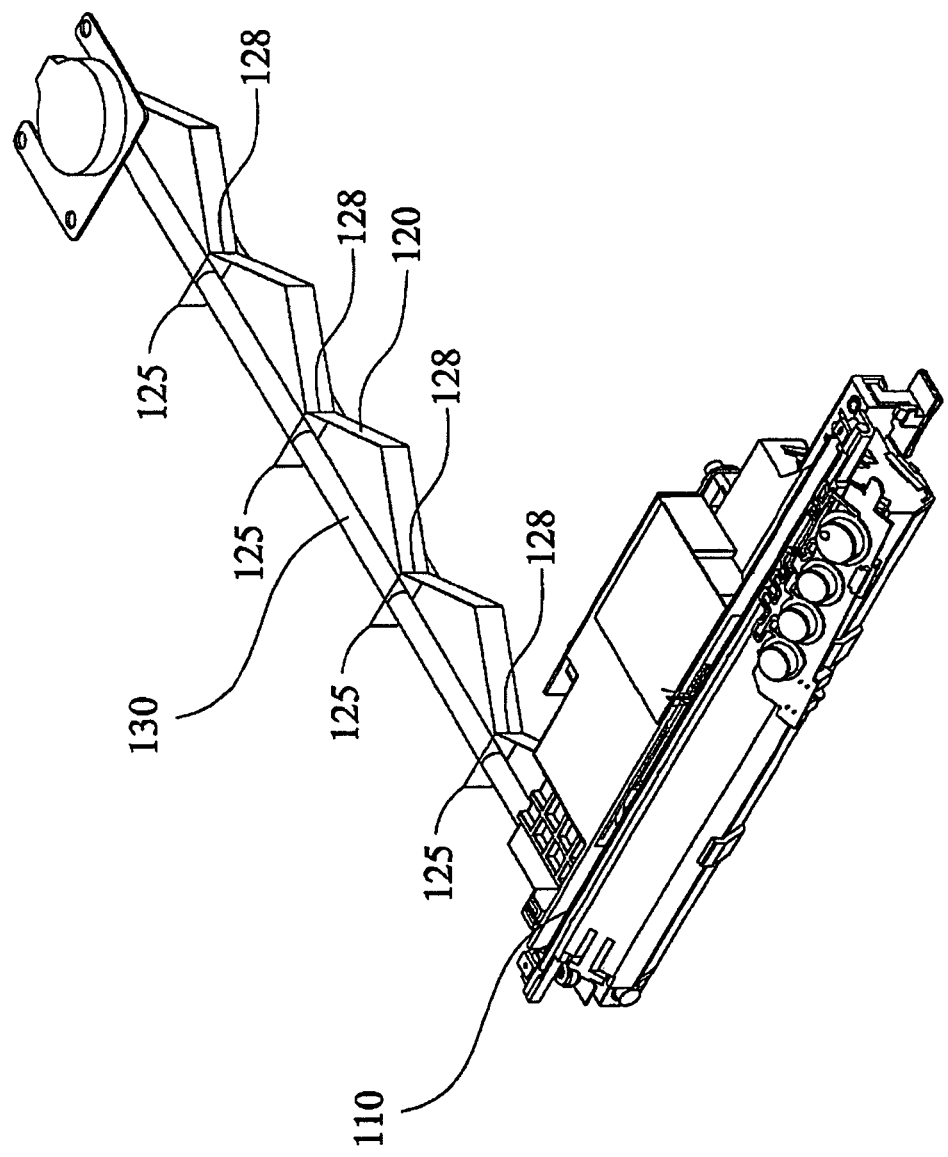
FIG. 2b is a combined view of the main elements of the present invention.

Back to FIG. 2b, when the scan module 110 moves along the shaft 130 (first path), the second end of the flat cable 120 is moved away from the first end, the cable holders 125 move along the shaft 130, such that distance between the cable holders 125 increases, and the flat cable 120 is extended. When the scan module 110 returns along the shaft 130, the second end 122 of the flat cable 120 approaches the first end 121, the cable holders 125 move along the shaft 130, and the distance therebetween decreases, and the flat cable 120 collapses. The cable holders 125 control bending angle of the flat cable 120 to maintain a constant distance between the restricting points and the first path; thus, the cable holders 125 prevent the flat cable 120 from contacting a transparent plate (not shown) above the scanner module 110 or lodging between the scanner module 110 and the housing (not shown).

In the embodiment mentioned above, the cable holders 125 and the first and the second ends of the flat cable 120 move along the shaft 130 (first path). However, the cable holders 125 can also move along a second path (not shown) parallel to the first path.

Additionally, if the flat cable 120 comprises elastic metal lines, the cable holders 125 can be eliminated, with the flat cable 120 collapsing by elasticity.

Figure 4A:
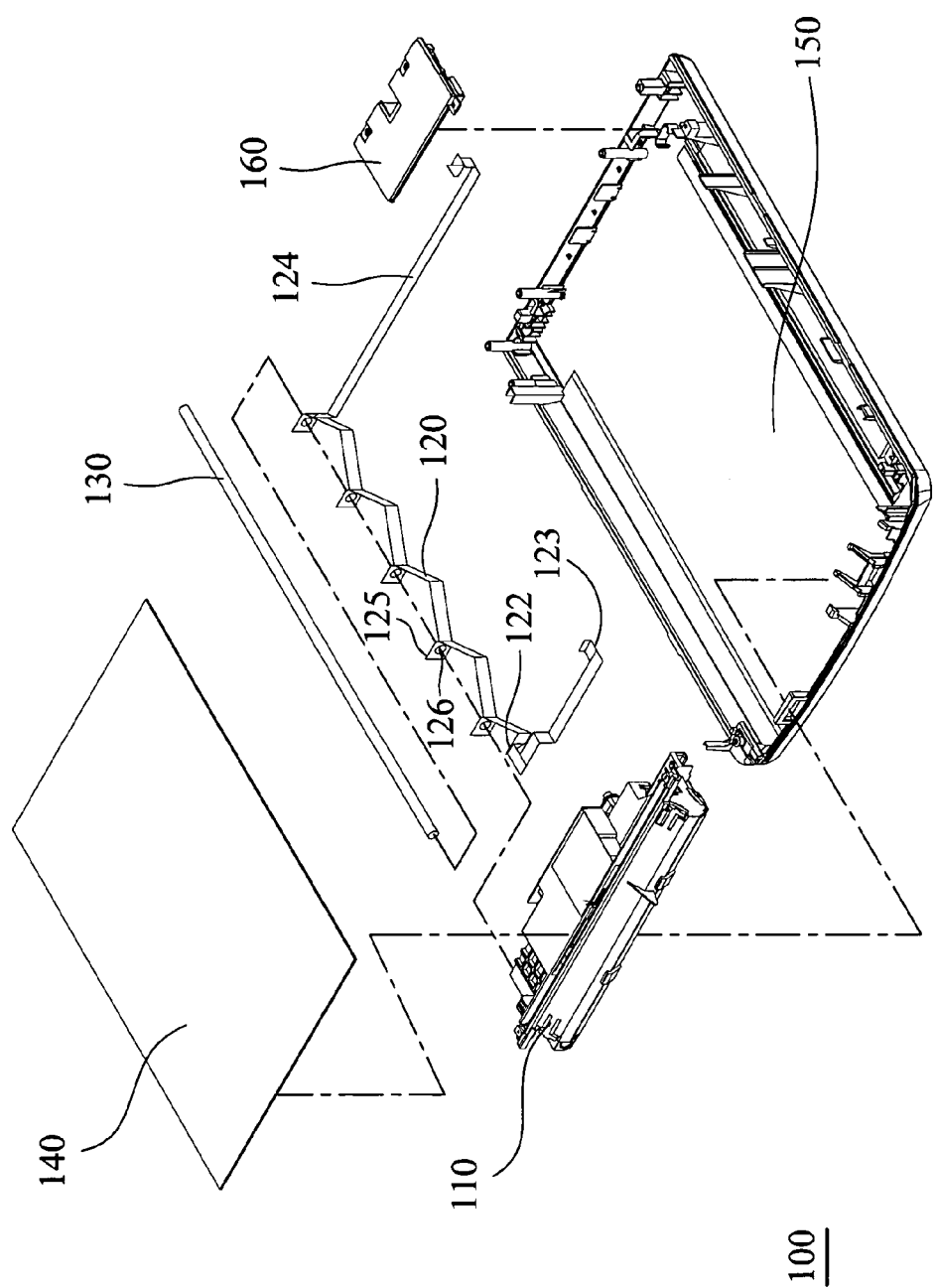
FIG. 4a is an exploded view of the present invention.
Figure 4B:
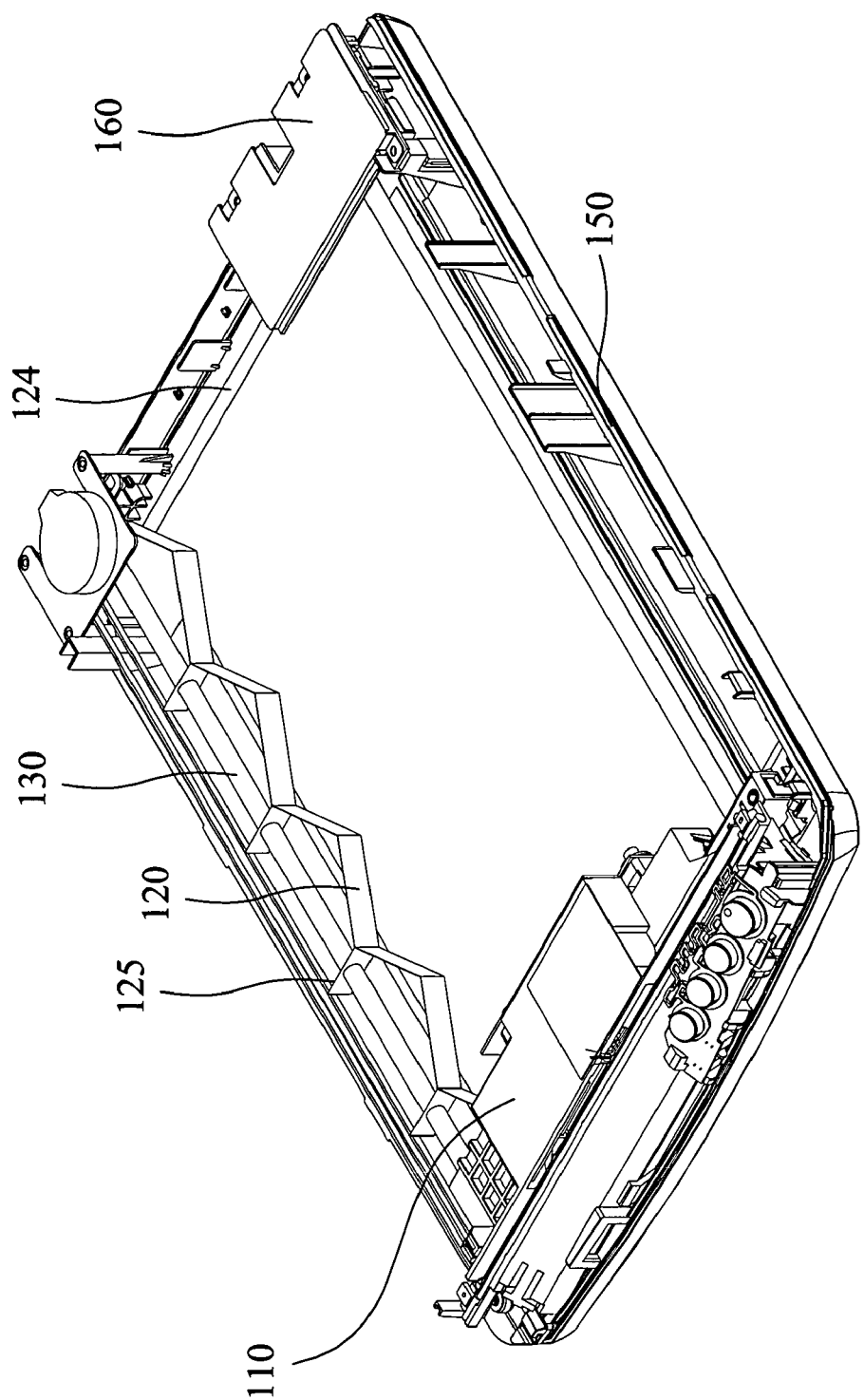
FIG. 4b is a combined view of the present invention.

As shown in FIG. 4a, the flat cable 120 is connected to a circuit board 160 by conductive line 124. The circuit board 160 controls the movement of the scan module 110. The flat cable 120, the shaft 130, the scan module 110, the cable holders 125 and the circuit board 160 are disposed in the housing 150. A transparent plate 140 is disposed on the housing 150. FIG. 4b is a combination figure of the elements mentioned. The shaft 130 is disposed in a side portion of the housing 150.

The present invention prevents the flat cable from rubbing the transparent plate and restricting movement of the scan module, thereby reducing scan errors and increasing lifetime of the scanner.

While the present invention has been described by way of example and in terms of the preferred embodiments, it is to be understood that the present invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A scanner, comprising:
    a flat cable, comprising a first end, a second end and a plurality of angle portions formed therebetween, the second end moving to or away from the first end along a first path;
    a plurality of cable holders, disposed on the angle portions whereby, when the second end moves to the first end, the cable holders contain and fold the flat cable;
    a housing;
    a shaft, disposed in the housing on the first path; and
    a scan module, movably disposed on the shaft and connected to the second end of the flat cable, wherein each cable holder comprises an opening through which the shaft passes, and each cable holder slides along the shaft with the opening.

2. The scanner as claimed in claim 1, wherein the flat cable has pleats.

3. The scanner as claimed in claim 2, wherein the flat cable pleats are triangular.

4. The scanner as claimed in claim 2, wherein the flat cable pleats follow a sine wave profile.

5. The scanner as claimed in claim 1, wherein the scan module is oriented lengthwise and comprises an end portion on the shaft.

6. The scanner as claimed in claim 1, wherein the cable holder comprises non-abrasive material.

7. The scanner as claimed in claim 1, wherein the cable holder comprises plastic.

* * * * *